US005966655A

United States Patent [19]
Hardouin

[11] Patent Number: 5,966,655
[45] Date of Patent: Oct. 12, 1999

[54] AUTOMATIC DETERMINATION OF AUDIO OR VIBRATION ALERTING FOR AN INCOMING CALL IN A WIRELESS HANDSET

[75] Inventor: Larry J. Hardouin, Westminster, Colo.

[73] Assignee: Lucent Technologies Inc., Murray Hill, N.J.

[21] Appl. No.: 08/845,969

[22] Filed: Apr. 30, 1997

[51] Int. Cl.[6] .................................................. H04Q 7/20
[52] U.S. Cl. .......................... 455/418; 455/38.2; 455/462; 455/561; 455/567
[58] Field of Search ................................. 455/418, 432, 455/433, 435, 456, 457, 462, 38.3, 38.2, 38.4, 561, 567; 340/825.44

[56] References Cited

U.S. PATENT DOCUMENTS

| 4,939,766 | 7/1990 | Umemoto et al. ...................... 455/462 |
| 5,373,548 | 12/1994 | McCarthy ............................... 455/462 |

FOREIGN PATENT DOCUMENTS

| 0505106 A2 | 9/1992 | European Pat. Off. . |
| 2300787 | 11/1996 | United Kingdom ............. H04Q 7/38 |

OTHER PUBLICATIONS

Weiss, K. et al., "Conventional Local Area Radio Coverage System", Motorola Technical Developments, vol. 13, Jul. 1, 1991, pp. 67–69.

Primary Examiner—Nguyen Vo
Assistant Examiner—Sam Bhattacharya
Attorney, Agent, or Firm—John C. Moran

[57] ABSTRACT

Determining for each base station in a wireless telecommunication switching system whether a wireless handset should receive audio or vibration alerting for incoming calls. The wireless telecommunication switching system utilizes information specifying alerting for the base stations that is entered by a system administrator. In addition, individual users may choose to specify areas designated by the system administrator for audio alerting as vibration alerting. The information specifying the audio or vibration alerting from either the administrator or individual users is specified for different periods of time for each of the base stations. The system administrator may directly determine the alerting information for each individual base station. Also, the system administrator may determine the alerting information for different areas of the building, and as base stations are added to the wireless telecommunication system, they inherit the attributes of the area in which they are placed.

8 Claims, 6 Drawing Sheets

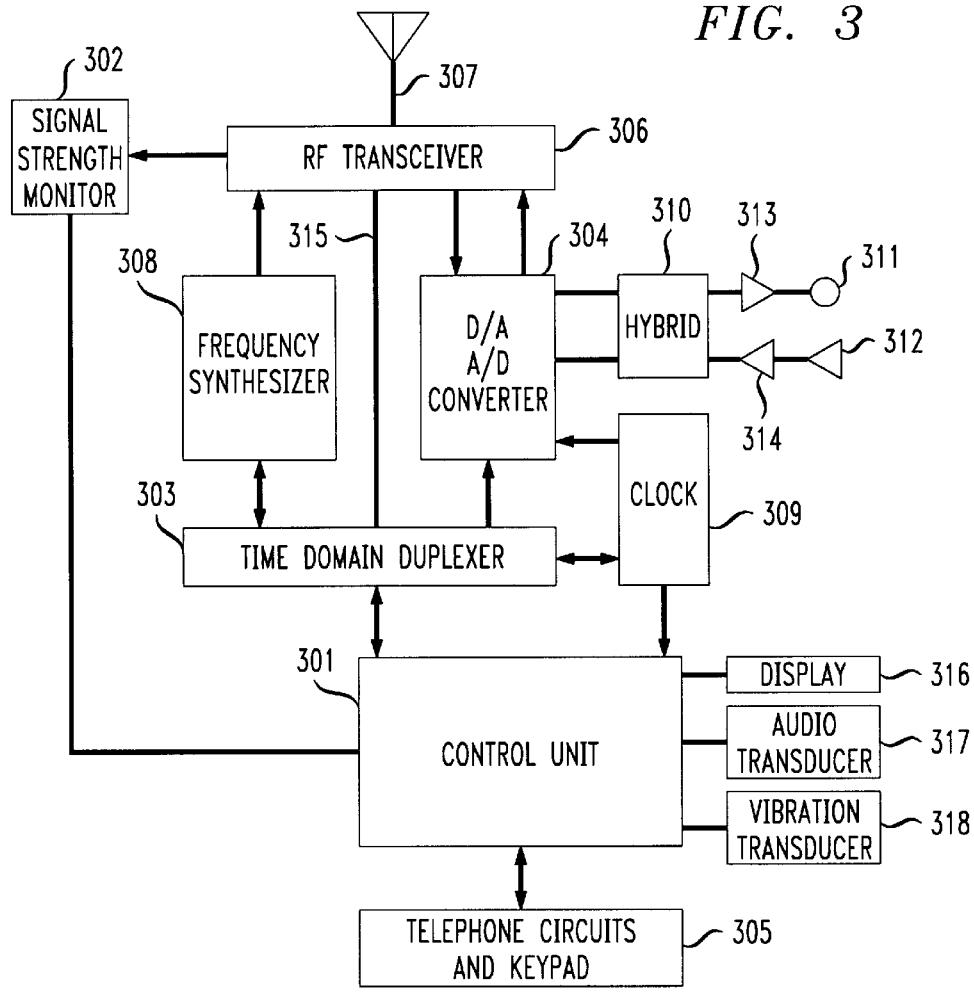

| WIRELESS HANDSET 111 TABLE 2 | | | |
|---|---|---|---|
| BASE STATION NUMBER | 1ST SHIFT | 2ND SHIFT | 3RD SHIFT |
| 501 — 101 | AUDIO | AUDIO | AUDIO |
| 502 — 102 | AUDIO | AUDIO | AUDIO |
| 503 — 103 | AUDIO | AUDIO | AUDIO |
| 504 — 104 | AUDIO | AUDIO | AUDIO |
| 506 — 106 | AUDIO | AUDIO | AUDIO |
| 507 — 107 | VIBRATION | AUDIO | AUDIO |
| 508 — 109 | VIBRATION | VIBRATION | AUDIO |
| | | | |

| GEOGRAPHICAL TABLE 3 | | | |
|---|---|---|---|
| AREA COORDINATES | 1ST SHIFT | 2ND SHIFT | 3RD SHIFT |
| (0,0) (50,0) (50,50) (0,33) | VIBRATION | NO CHOICE | NO CHOICE |
| (50,0) (100,0) (100,20) (50,50) | NO CHOICE | NO CHOICE | NO CHOICE |
| (100,20) (100,100) (20,100) (50,50) | NO CHOICE | NO CHOICE | NO CHOICE |
| (0,33) (50,50) (20,100) (0,100) | VIBRATION | NO CHOICE | NO CHOICE |
| | | | |

AUTOMATIC DETERMINATION OF AUDIO OR VIBRATION ALERTING FOR AN INCOMING CALL IN A WIRELESS HANDSET

CROSS-REFERENCE TO RELATED APPLICATIONS

L. J. Hardouin, "Automatic Volume Adjustment in a Wireless Handset"; and

L. J. Hardouin, "Geographical Determination of Wireless Operations".

These applications are filed concurrently with this application and are assigned to the same assignee.

TECHNICAL FIELD

This invention relates to wireless telecommunication switching systems and wireless handsets.

BACKGROUND OF THE INVENTION

Personal communication service (PCS) is provided in a variety of environments. One of these environments is the academic or business environment in which there are certain areas where it is not desirable to have audio alerting (ringing) given for incoming calls. Rather, the preferred method is to use a physical transducer that will cause the PCS wireless handset to vibrate which is detectable by the user. The areas in which audio or vibration alerting is desired vary depending on the time of the day. In certain areas, the users themselves may decide to use audio or vibration alerting; however, in other areas the PCS system administrator may wish to designate certain areas in which audio alerting will not be utilized. One such area would be an auditorium during certain hours. In addition, the users of PCS wireless handsets are constantly moving within the environment, and it is an inconvenience to constantly have to adjust between audio and vibration alerting.

SUMMARY OF THE INVENTION

This invention is directed to solving this problem and other disadvantages of the prior art. In accordance with the invention, a wireless telecommunication switching system determines for each base station whether a wireless handset should receive audio or vibration alerting for incoming calls. The wireless telecommunication switching system utilizes information specifying alerting for the base stations that is entered by a system administrator. In addition, individual users may choose to specify areas designated by the system administrator for audio alerting as vibration alerting. Advantageously, the information specifying the audio or vibration alerting from either the administrator or individual users is specified for different periods of time for each of the base stations. In a first embodiment, the system administrator directly determines the alerting information for each individual base station. In a second embodiment, the system administrator determines the alerting information for different areas of the building, and as base stations are added to the wireless telecommunication system, they inherit the attributes of the area where they are placed.

Other and further aspects of the present invention will become apparent during the course of the following description and by reference to the accompanying drawing.

BRIEF DESCRIPTION OF THE DRAWING

FIG. 3 illustrates, in block diagram form, a wireless handset;

FIG. 4 illustrates a table utilized in the inventive concept;

DETAILED DESCRIPTION

Figure 1:
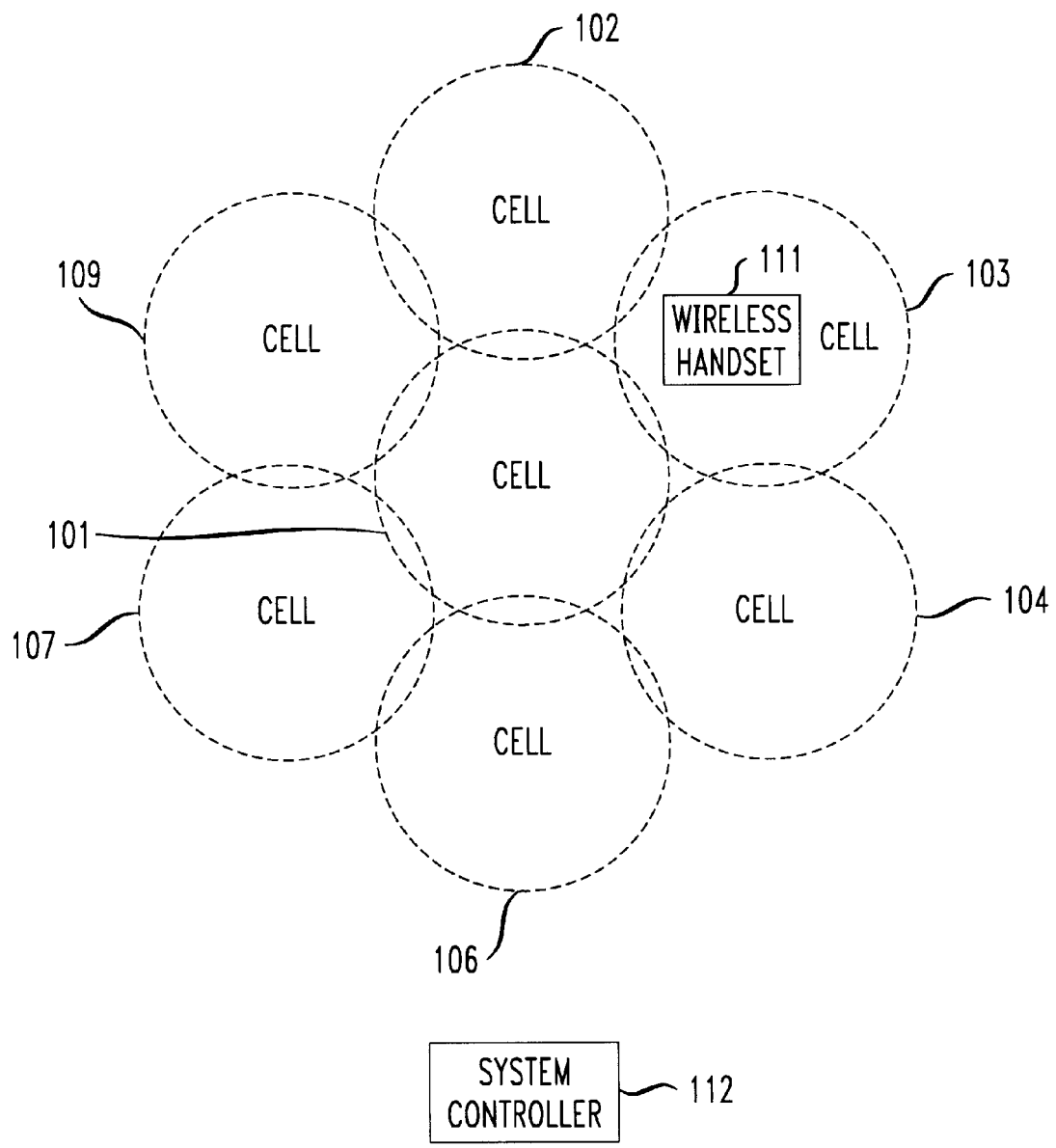
FIG. 1 illustrates a wireless telecommunication switching system embodying the inventive concept.

FIG. 1 illustrates a wireless telecommunication switching system having a plurality of wireless cells (also referred to as cell sites) which are cells 101–109. These plurality of cells are providing service for wireless handsets such as wireless handset 111. Each cell consists of a base station that is not illustrated in FIG. 1 but is illustrated in detail in FIG. 2. The cells illustrated in FIG. 1 are under control of system controller 112. The geographical area covered by the cells is illustrated as being a circle; however, one skilled in the art would immediately recognize that the geographical area covered by each cell could be of a different configuration. System controller 112 controls the operation of the cells by controlling the base stations via communication links that are not illustrated in FIG. 1.

To understand the operation of the wireless telecommunication switching system of FIG. 1, consider the following example. When wireless handset 111 moves from cell 101 to cell 103, system controller 112 examines internal tables that define whether audio or vibration alerting is to be used for each cell and transmits via the base station controlling cell 103 the alerting information to wireless handset 111. System controller 112 becomes aware that wireless handset 111 has moved to cell 103 when wireless handset 111 registers on the base station controlling cell 103.

Figure 2:
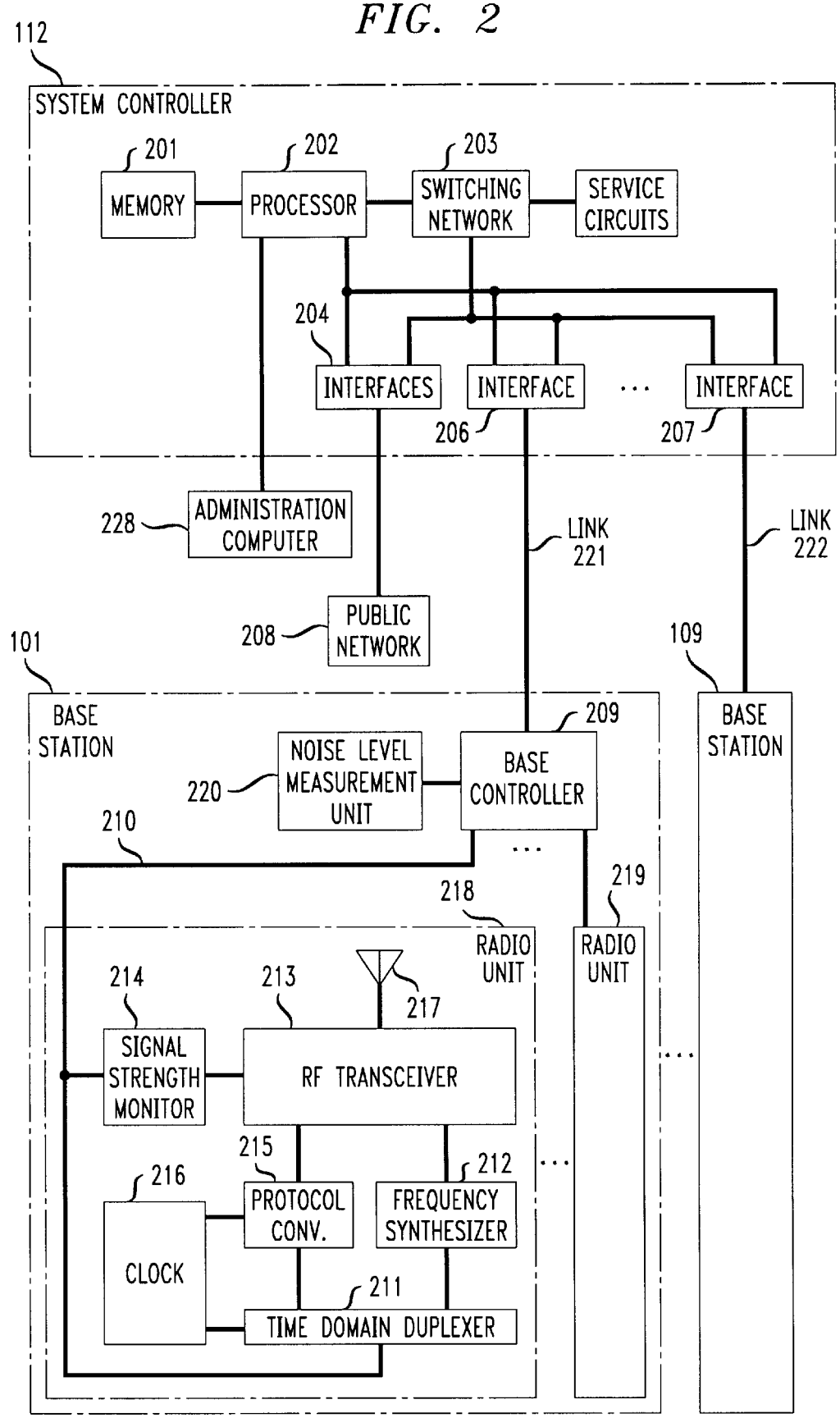
FIG. 2 illustrates, in block diagram form, the wireless telecommunication switching system of FIG. 1.

FIG. 2 illustrates, in block diagram form, the wireless telecommunication system illustrated in FIG. 1. System controller 112 is under the control of processor 202 which executes programs and utilizes data stored in memory 201. System controller 112 interfaces to public network 208 via interfaces 204. System controller 112 is interconnected to base stations 101–109 via links 221–222 which terminate on interfaces 206–207. The switching of audio and data received via interfaces 206–207 is performed by switching network 203 under control of processor 202. Base station 101 illustrates in greater detail the composition of a base station. Each base station comprises a plurality of radio units 218–219 that are under the control of base controller 209.

Figures 5, 6:
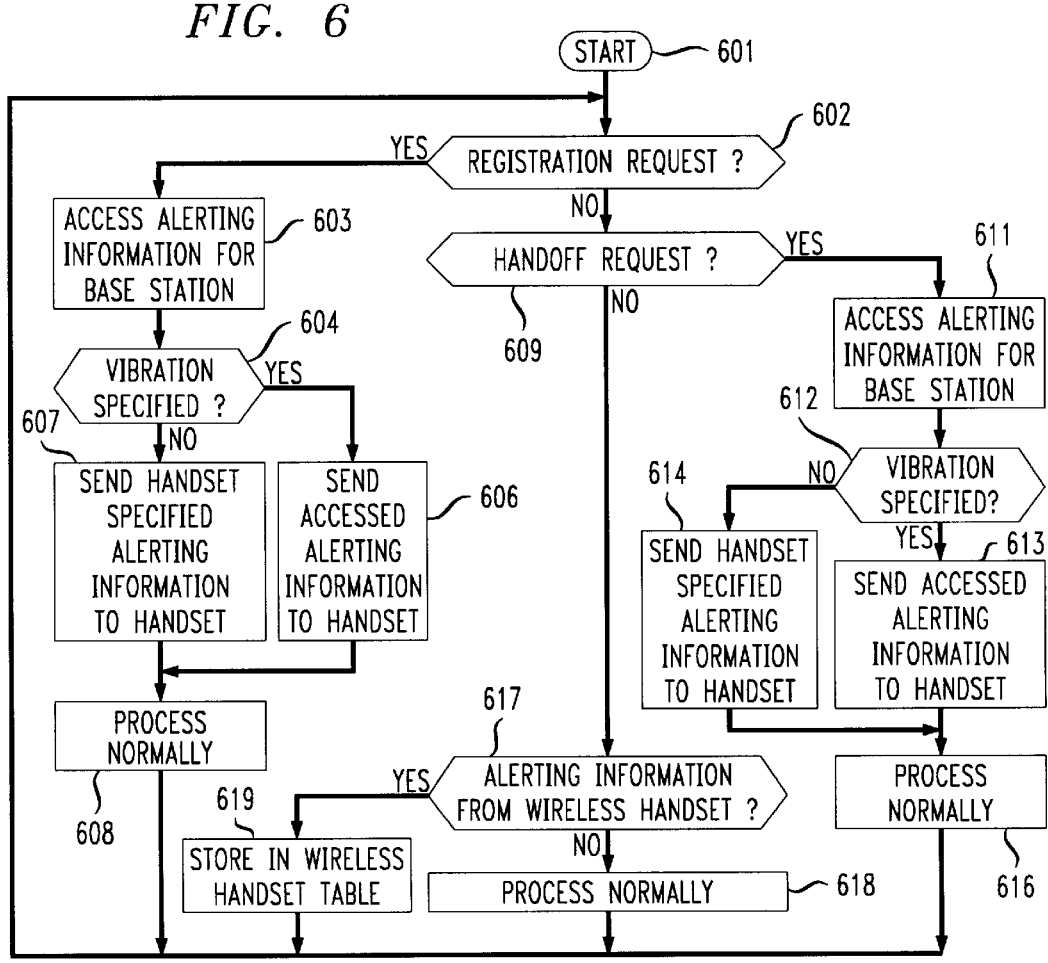
FIG. 5 illustrates a table utilized in the inventive concept.
FIG. 6 illustrates, in flow chart form, the steps performed by a system controller in implementing the first embodiment of invention.

Processor 202 is responsive to alerting information from a wireless handset and system administrator to store alerting information in memory 201. In the first embodiment, the system administrator uses administration computer 228 to directly enter the alerting information for each individual base station; whereas for the second embodiment, the system administrator defines the alerting information for given geographical areas, and administration computer 228 determines the alerting information for each individual base station. In either the first or second embodiment, the information from the system administrator is stored in Table 1 as illustrated in FIG. 4, and the information from a wireless handset is stored in a table such as Table 2 as illustrated in FIG. 5. When a wireless handset registers on a new base station, processor 202 accesses Tables 1 and 2 of FIGS. 4 and 5, respectively, to determine the alerting mechanism to be used by the handset.

Wireless handset 111 is illustrated in greater detail in FIG. 3. Other wireless handsets are identical in design. Wireless handset 111 implements a wireless protocol that allows wireless handset 111 to maintain a wireless signal link with system controller 112 via the base stations. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 301. Units 302, 303, 306, 307, 308, and 309 provide the RF communication capabilities for the wireless handset. Elements 304, 310, and 311–314 provide the audio information received and transmitted to the user; whereas, elements 316–318 and 305 provide the basic user interface. Control unit 301 is responsive to alerting information received from a base station via elements 303, 306, and 307 to select vibration transducer 318 or audio transducer 317 in accordance with the invention.

System Level Table 1 of FIG. 4 defines the alerting mechanism specified by the system administrator. The choice of the system administrator overrides the choice of any individual user. Wireless handset 111 Table 2 of FIG. 5 illustrates the choice of the user of wireless handset 111 for the various time periods and base stations. Note that the user of wireless handset 111 wishes to use audio alerting on base station 101 during the first shift. However, vibration alerting will be utilized since that is what is specified by the system administrator in FIG. 4. The table for each wireless handset is initially set to audio alerting for each of the base stations. System Level Table 1 overrides this audio alerting if vibration alerting is specified, or the user of the wireless handset may change the audio alerting to vibration alerting.

FIG. 6 illustrates, in flow chart form, the steps performed by system controller 112 for both the first and second embodiments. After starting at block 601, decision block 602 determines if the wireless handset has registered on a new base station. If the answer is yes, block 603 accesses System Level Table 1 to obtain the alerting information for the new base station. Decision block 604 determines whether or not the system administrator has designated that vibration alerting is to be utilized. If the answer is yes, block 606 transmits the accessed alerting information to the handset before transferring control to block 608. The latter block performs the normal registration request processing. If the answer in decision block 604 is no, then the wireless handset table such as wireless handset 111 Table 2 of FIG. 5 is accessed by block 607, and the accessed alerting information is transmitted to the wireless handset by block 607 before control is transferred to block 608.

Returning to decision block 602, if the answer is no, decision block 609 determines if a handoff request has been received. If a handoff request has been received, control is transferred to block 611. The wireless handset is presently active on a call; but the alerting information will be transmitted to the wireless handset for the new base station so that information is available once the active call has been terminated. Block 611 accesses the alerting information for the base station. Decision block 612 determines if the system administrator has specified that vibration alerting is to be utilized. If the answer is yes, block 613 transmits the accessed alerting information to the wireless handset before transferring control to block 616 for the normal processing of a handoff. If the answer is no in decision block 612, block 614 accesses the wireless handset table and transmits the information to the wireless handset before transferring control to block 616 for the normal processing of a handoff.

Returning to decision block 609, if the answer is no, control is transferred to decision block 617. Decision block 617 determines if alerting information has been received from the wireless handset. If the answer is no, block 618 processes the stimulus from the wireless handset in a normal manner. If the decision in decision block 617 is yes, block 619 stores the specified alerting information in the wireless handset table associated with the wireless handset before returning control back to decision block 602.

Figures 7, 8:
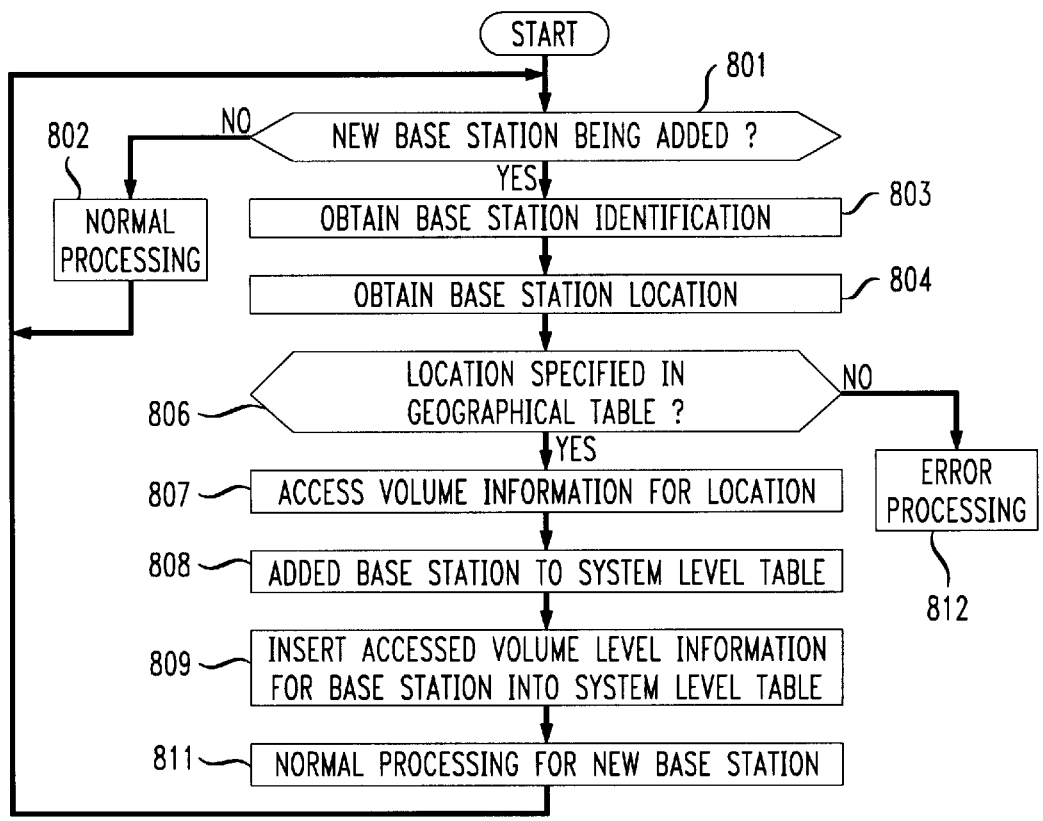
FIG. 7 illustrates a table utilized in the second embodiment of the invention.
FIG. 8 illustrates, in flow chart form, the steps performed by an administration computer in implementing the second embodiment of the invention.
Figure 9:
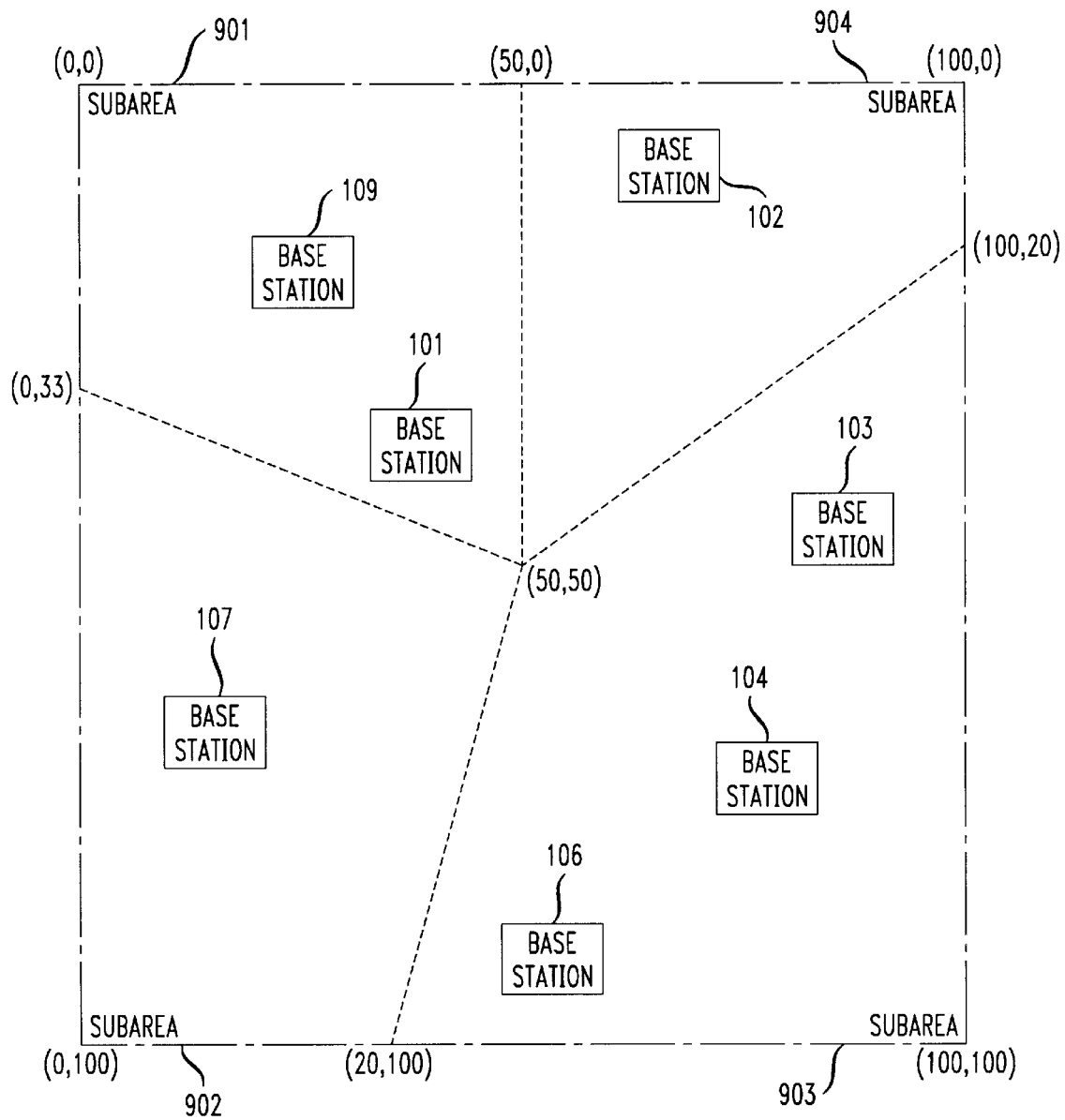
FIG. 9 illustrates an area for which a wireless telecommunication switching system is providing service being divided into sub-areas for implementing the second embodiment of the invention.

FIG. 7 illustrates Geographical Table 3 which is maintained by administration computer 228 of FIG. 2 for the second embodiment. The area coordinates used in FIG. 7 are defined by FIG. 9. Geographical Table 3 is established by the system administrator. FIG. 8 illustrates the steps performed by administration computer 228 for the second embodiment when a new base station is added to the wireless telecommunication switching system illustrated in FIG. 2. Decision block 801 determines if a new base station is being added. If the answer is no, block 802 performs normal processing before returning control back to decision block 801. If the answer is yes in decision block 801, block 803 obtains the base station identification from the system administrator, and block 804 obtains the location at which the new base station is to be installed. Decision block 806 then accesses Geographical Table 3 of FIG. 7 to determine if the location of the new base station is specified in this table. If the answer is no, block 812 performs error processing. If the answer is yes, block 807 accesses Geographical Table 3 to obtain the alerting information for the new base station. Block 808 then adds the new base station into System Level Table 1 of FIG. 4. Block 809 then inserts the accessed alerting information from Geographical Table 3 into the row provided in System Level Table 1 for the new base station. Block 811 performs the normal processing for a new base station before returning control back to decision block 801.

It is to be understood that the above-described embodiment is merely illustrative of the principles of the invention and that other arrangements may be devised by those skilled in the art without departing from the spirit and scope of the invention. In particular, it would be apparent to one skilled in the art that other alerting mechanisms could be utilized.

What is claimed is:

1. A method of selecting one of a plurality of types of alerting in a plurality of wireless handsets by a wireless telecommunication switching system under control of a system controller providing wireless telecommunication service to the plurality of wireless handsets via a plurality of base stations, comprising the steps of:

storing by the system controller in a first table individual alerting information specifying ones of the plurality of types of alerting for each of the plurality of base stations wherein the individual alerting information may not specify one of the types of alerting for a subset of the plurality of base stations;

receiving by the system controller transmitted user specified alerting information specifying ones of the plurality of types of alerting by the one of the plurality of wireless handsets for each of the plurality of base stations;

storing by the system controller in a second table the transmitted user specified alerting information for each of the plurality of base stations;

selecting the user specified alerting information as alerting information for transmission from the second table for the one of the plurality of wireless handsets upon the one of plurality of wireless handsets being located on one of the subset of the plurality of base stations;

detecting by the system controller a change of location by one of the plurality of wireless handsets; and transmitting by the system controller alerting information specifying one of the plurality of types of alerting for the one of the plurality of wireless handsets in response to the detection of the location change.

2. The method of claim 1 wherein the individual alerting information stored in the first table is directly specified for each of the plurality of base stations by the system administrator.

3. The method of claim 1 further comprises the steps of specifying ones of the plurality of types of alerting for individual geographical areas in a third table;

specifying the geographical area in which each of the plurality of base stations is located; and determining the individual alerting information to be stored in the first table for each of the plurality of base stations by selecting the individual alerting information from the third table using the specified geographical area for each of the plurality of base stations.

4. The method of claim 2 or claim 3 wherein the types of alerting comprises audio alerting and vibration alerting by the one of the plurality of wireless handsets.

5. An apparatus for selecting one of a plurality of types of alerting in a plurality of wireless handsets having a wireless telecommunication switching system under control of a system controller providing wireless telecommunication service to the plurality of wireless handsets via a plurality of base stations, comprising:

means for storing in a first table individual alerting information specifying ones of a plurality of types of alerting for each of the plurality of base stations wherein the individual alerting information may not specify one of the types of alerting for a subset of the plurality of base stations;

means for receiving transmitted user specified alerting information specifying ones of the plurality of types of alerting by the one of the plurality of wireless handsets for each of the plurality of base stations;

means for storing in a second table the transmitted user specified alerting information for each of the plurality of base stations;

means for selecting the user specified alerting information as alerting information for transmission for the second table for the one of the plurality of wireless handsets upon the one of the plurality of wireless handsets being located on one of the subsets of the plurality of base stations;

means for detecting a change of location by one of the plurality of wireless handsets; and means for transmitting alerting information specifying one of the plurality of types of alerting for the one of the plurality of wireless handsets in response to the detection of the location change.

6. The apparatus of claim 5 wherein the individual alerting information stored in the first table is directly specified for each of the plurality of base stations by the system administrator.

7. The apparatus of claim 5 further comprises means for specifying ones of the plurality of types of alerting for individual geographical areas in a third table;

means for specifying the geographical area in which each of the plurality of base stations is located; and means for determining the individual alerting information to be stored in the first table for each of the plurality of base stations by selecting the individual alerting information from the third table using the specified geographical area for each of the plurality of base stations.

8. The apparatus of claim 6 or claim 7 wherein the types of alerting comprises audio alerting and vibration alerting by the one of the plurality of wireless handsets.

* * * * *